United States Patent [19]

Akasaki et al.

[11] Patent Number: 4,820,600
[45] Date of Patent: Apr. 11, 1989

[54] ELECTROPHOTOGRAPHIC PHOTORECEPTOR HAVING A BISAZO COMPOUND

[75] Inventors: Yutaka Akasaki; Akihiko Tokita; Kaoru Torikoshi; Akira Imai; Touru Ishii, all of Kanagawa, Japan

[73] Assignee: Fuji Xerox Co., Ltd., Tokyo, Japan

[21] Appl. No.: 81,509

[22] Filed: Aug. 5, 1987

[30] Foreign Application Priority Data

Aug. 5, 1986 [JP] Japan ................................. 61-182695

[51] Int. Cl.⁴ .............................................. G03G 5/06
[52] U.S. Cl. ........................................ 430/58; 430/72; 430/76; 430/78
[58] Field of Search ....................... 430/58, 72, 73, 76, 430/78; 544/658, 653

[56] References Cited

U.S. PATENT DOCUMENTS 4,400,455 8/1983 Hashimoto et al. .................. 430/76
4,451,398 5/1984 Patsch et al. ......................... 544/208
4,515,881 5/1985 Sawada .

Primary Examiner—John L. Goodrow
Attorney, Agent, or Firm—Sughrue, Mion, Zinn, Macpeak & Seas

[57] ABSTRACT

An electrophotographic photoreceptor is disclosed, comprising a conductive support having provided thereon a photosensitive layer containing a bisazo compound represented by formula (I)

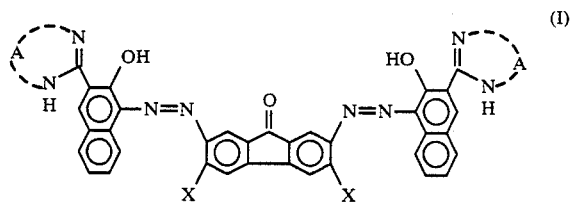

wherein X represents a halogen atom or a nitro group, and A represents a substituted or unsubstituted divalent aromatic hydrocarbon group or a substituted unsubstituted divalent nitrogen-containing heterocyclic group. The photoreceptor exhibits excellent sensitivity and durability.

9 Claims, No Drawings

ELECTROPHOTOGRAPHIC PHOTORECEPTOR HAVING A BISAZO COMPOUND

FIELD OF THE INVENTION

This invention relates to an electrophotograhic photoreceptor, and more particularly to an electrophotographic photoreceptor having a photosensitive layer containing a specific azo pigment.

BACKGROUND OF THE INVENTION

Photoconductive substances widely known as materials for electrophotographic photoreceptors include inorganic substances, such as amorphous selenium, selenium alloys, cadmium sulfide, zinc oxide, etc., and organic substances exemplified by polyvinylcarbazole and its derivatives. The organic photoconductive substances are advantageous over the inorganic ones because of superiority in transparency, film-forming properties, flexibility, productivity, and the like.

In spite of the above-mentioned advantage, the organic photoconductive substances have not been used in an electrophotographic photoreceptor since they are inferior to the inorganic photoconductive substances in sensitivity and durability.

In an attempt of overcoming these problems, electrophotographic photoreceptors having a photosensitive layer containing an azo pigment have been proposed, such as those disclosed in Japanese patent application (OPI) Nos. 22834/79, 94360/81, 23450/85, 129653/86, and 221751/86 (the term "OPI" as used herein means an "unexamined published Japanese patent application"), and Japanese patent publication No. 29109/85. However, none of those azo pigments used therein is satisfactory.

SUMMARY OF THE INVENTION

One object of this invention is to provide an electrophotographic photoreceptor using an organic photoconductive substance and yet having high sensitivity and high durability.

The inventors have conducted extensive investigations on bisazo compounds. As a result, it has now been found that a bisazo compound synthesized by using a coupling component different from those used in conventionally proposed fluorenone type bisazo pigments is advantageously used in electrophotographic photoreceptors.

That is, the present invention relates to an electrophotographic photoreceptor comprising a conductive support having provided thereon a photosensitive layer containing a bisazo compound represented by formula (I)

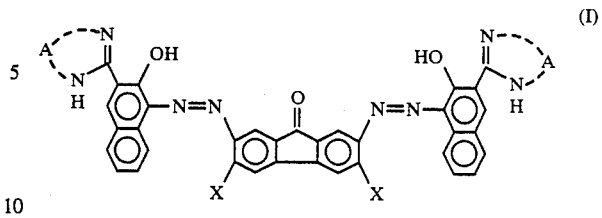

wherein X represents a halogen atom or a nitro group, and A represents a divalent aromatic hydrocarbon group or a divalent nitrogen-containing heterocyclic group.

DETAILED DESCRIPTION OF THE INVENTION

The halogen atom for X includes a fluorine atom, a chlorine atom, a bromine atom and an iodine atom, with a chlorine atom being preferred.

The divalent aromatic hydrocarbon group represented by A preferably has from 6 to 14 carbon atoms and includes a divalent monocyclic aromatic hydrocarbon group such as an o-phenylene group, and a divalent condensed polycyclic aromatic hydrocarbon group such as an o-naphthylene group, a perinaphthaliene group, a 1,2-anthraquinonyl group, and a 9,10-phenanthrylene group, etc.

The divalent nitrogen-containing heterocyclic group represented by A preferably has from 4 to 12 carbon atoms and 1 or 2 nitrogen atoms and includes a 3,4-pyrazole-diyl group, a 2,3-pyridine-diyl group, a 3,4-pyridine-diyl group, a 4,5-pyridine-diyl group, a 5,6-benzimidazole-diyl group, a 6,7-quinoline-diyl group, etc.

These divalent aromatic or heterocyclic groups may have substituents, such as an alkyl group having from 1 to 18 carbon atoms, an alkoxy group having from 1 to 4 carbon atoms, an alkoxycarbonyl group having from 1 to 4 carbon atoms, a carboxyl group, a hydroxyl group, a nitro group, a cyano group, a halogen atom, a trifluoromethyl group, a carbamoyl group preferably having from 1 to 6 carbon atoms (e.g., a carbamoyl group, an N-methylcarbamoyl, an N-ethylcarbamoyl group, etc.), a sulfamoyl group preferably having from 1 to 6 carbon atoms, and a phenoxy group.

Taking sensitivity and durability into consideration, X in formula (I) is preferably a chlorine atom; and A preferably represents an o-phenylene group, an o-naphthylene group, a perinaphthylene group, a 2,3-pyridine-diyl group, a 3,4-pyridine-diyl group, a 4,5-pyridine-diyl group or a 9,10-phenanthrylene group, with a substituent being preferably selected from an alkyl group, an alkoxy group, a carboxyl group, a hydroxyl group, a nitro group, and a halogen atom.

Specific but non-limiting examples of the bisazo compound represented by formula (I) are shown below.

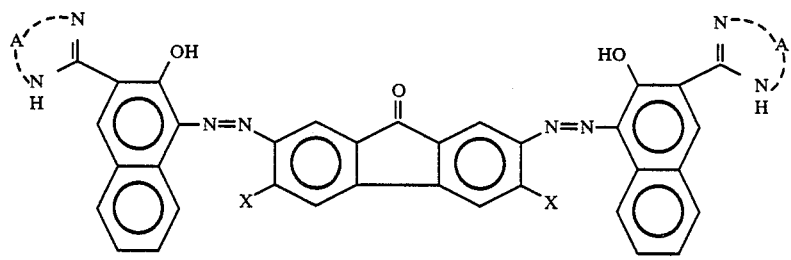
| Compound No. | X | A |
|---|---|---|
| 1 | Cl | 3,4-dimethylphenyl |
| 2 | Cl | 3-chloro-5,6-dimethylphenyl |
| 3 | Cl | 4-methyl-2,3-dimethylphenyl (tolyl) |
| 4 | Cl | 4-nitro-2,3-dimethylphenyl |
| 5 | Cl | 4-methoxy-2,3-dimethylphenyl |
| 6 | Cl | 4-carboxyphenyl |
| 7 | Cl | 4-hydroxy-5,6-dimethylpyrimidinyl |
| 8 | Cl | 2,3-pyridinyl |
| 9 | Cl | 3,4-pyridinyl |
| 10 | Cl | 4,5-dimethylpyrimidinyl |

-continued
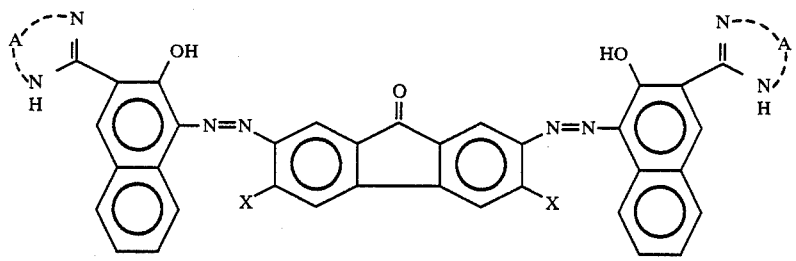
| Compound No. | X | A |
|---|---|---|
| 11 | Cl | naphthalene (2,3-) |
| 12 | Cl | naphthalene (1,2-) |
| 13 | Cl | phenanthrene |
| 14 | NO$_2$ | phenyl |
| 15 | NO$_2$ | 4-chlorophenyl |
| 16 | NO$_2$ | 4-methylphenyl |
| 17 | NO$_2$ | 4-nitrophenyl |
| 18 | NO$_2$ | 4-methoxyphenyl |
| 19 | NO$_2$ | 4-carboxyphenyl |

-continued

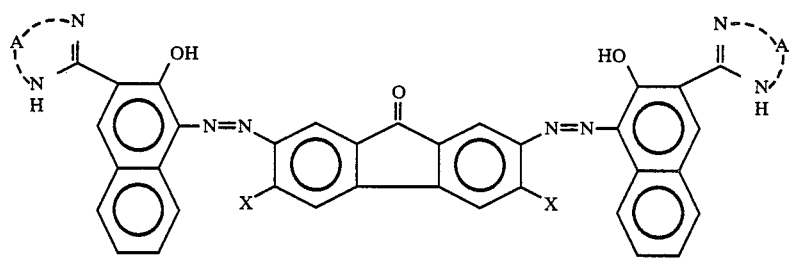

| Compound No. | X | A |
|---|---|---|
| 20 | NO₂ | (4-hydroxypyrimidine) |
| 21 | NO₂ | (pyridine) |
| 22 | NO₂ | (pyridine) |
| 23 | NO₂ | (pyrazine) |
| 24 | NO₂ | (naphthalene) |
| 25 | NO₂ | (naphthalene) |
| 26 | NO₂ | (phenanthrene) |
| 27 | Br | (benzene) |

The bisazo compound of formula (I) can be synthesized by subjecting the corresponding diamine represented by formula (II) to diazotation to convert it into a tetrazonium salt which may be isolated in the form of a borofluoride or a zinc chloride double salt, and then coupling it with a coupling component represented by formula (III).

Diamine represented by formula (II):

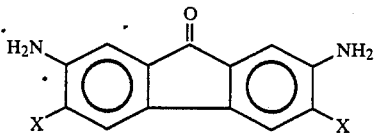

(II)

Coupling component represented by formula (III):

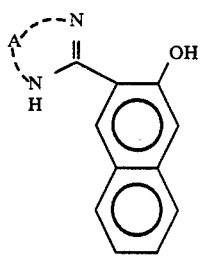

(III)

(wherein X and A are as defined above)

The diazotation can be performed, for example, by adding sodium nitrite in an inorganic acid (e.g., hydrochloric acid, sulfuric acid, etc.) containing the diamine at a temperature of from about −10° to 25° C. This reaction time is generally from 3 minutes to 3 hours. Further, the coupling reaction can be performed in a conventional manner, for example, by dissolving the tetrazonium salt and the compound of formula (III) in an organic solvent (e.g., N,N-dimethylformamide, dimethyl sulfoxide, etc.) and adding dropwise thereto an alkaline aqueous solution (e.g., a sodium acetate aqueous solution) at a temperature of from −10° to 40° C.

In the present invention, the bisazo compound is incorporated into a photosensitive layer formed on a conductive support. The photosensitive layer may have a single layer structure or a laminated structure in which the function is divided into a charge generating layer and a charge transport layer.

The electrophotographic photoreceptors according to the present invention can be classified into three groups: (1) those having a photosensitive layer in which the bisazo compound is dispersed in a binder resin containing a charge transport substance; (2) those having a photosensitive layer in which the bisazo compound and a charge transfer complex are dispersed in a binder resin; and (3) those having a charge generating layer containing the bisazo compound and a charge transport layer containing a charge transport substance. In the case of groups (1) and (2), the photosensitive layer generally has a thickness of from about 5 to 40 μm and preferably from about 10 to 25 μm, and in the case of group (3) the thicknesses of the charge generating layer and the charge transport layer are generally from about 0.05 to 5 μm and from about 5 to 40 μm, and preferably from about 0.1 to 1.0 μm and from about 10 to 25 μm, respectively.

The conductive support which can be used in the present invention includes a metal plate, drum or foil composed of aluminum, nickel, chromium, stainless steel, etc.; a plastic film on which a thin film of a metal or other conductive substance is provided; and paper or a plastic film having been coated or impregnated with a conductivity-imparting substance.

In cases where the bisazo compound is dispersed in a binder resin to form a photosensitive layer, it is preferably dispersed as fine particles having a particle size of 3 μm or less, and more preferably 0.3 μm or less, in a proportion of from about 10 to 90% by weight based on the total weight of the layer to which the bisazo compound is added (i.e., the photosensitive layer in the case of groups (1) and (2), and the charge generating layer in the case of group (3)). The amount of the bisazo compound is preferably from about 10 to 50% by weight in the case of groups (1) and (2), and from about 50 to 99% by weight in the case of group (3).

Examples of the binder resin to be used include polystyrenes, silicone resins, polycarbonates, acrylic resins, methacrylic resins, polyesters, vinyl polymers (e.g., polyvinyl butyral), cellulose derivatives (e.g., cellulose esters and cellulose ethers), alkyd resins, etc.

Examples of the charge transport substance to be used in the photoreceptors are hydrazone compounds, e.g., N-methyl-N-phenylhydrazino-3-methylidene-9-ethylcarbazole, N,N-diphenylhydrazino-3-methylidene-9-ethylcarbazole, N,N-diphenylhydrazino-3-methylidene-9-methylcarbazole, p-diethylaminobenzaldehyde-N,N-diphenylhydrazone, p-diethylaminobenzaldehyde-N,N-di(p-methoxyphenyl)hydrazone, p-diethylaminobenzaldehyde-N-(α-naphthyl)-N-phenylhydrazone, β,β-di(4-methoxyphenyl)acroleindiphenylhydrazone, etc.; pyrazolines, e.g., 1-phenyl-3-(p-diethylaminostyryl)-5-(p-diethylaminostyryl)-5-(p-diethylaminophenyl)pyrazoline, 1-[quinolyl(2)]-3-(p-diethylaminostyryl)-5-(p-diethylaminophenyl)pyrazoline, etc.; oxazole compounds, e.g., 2-(p-dipropylaminophenyl)-4-(p-dimethylaminophenyl)-5-(2-chlorophenyl)oxazole, 2-(p-diethylaminostyryl)-6-diethylaminobenzoxazole, etc.; oxadiazoles, eg., 2,5-bis(p-diethylaminophenyl)-1,3,4-oxadiazole, 2,5-bis(4'-diethylamino-2'-methylphenyl)-1,3,4-oxadiazole, etc.; triarylmethane compounds, e.g., bis(4-diethylamino-2-methylphenyl)-phenylmethane, etc.; triarylamine compounds, e.g., triphenylamine, 2,4',4''-trimethyltriphenylamine, 1,1-bis[4'-N,N-di(p-methylphenyl)aminophenyl]cyclohexane, etc.; anthracene compounds, e.g., 5-(p-diethylaminostyrylanthracene, etc.; stilbene compounds, e.g., α-phenyl-4'-N,N-diphenylaminostilbene, 4'-N,N-di(p-methoxyphenyl)aminostilbene, etc.; benzidine compounds, e.g., N,N'-diphenyl-N,N'-bis(3-methylphenyl)-[1,1'-biphenyl]-4,4'-diamine, 3,3'-dimethyl-N,N,N',N'-tetrakis(4-methylphenyl)-[1,1'-biphenyl]-4,4'-diamine, etc.; and so on. These charge transport substances are incorporated into a binder resin. In addition, photoconductive polymers, such as poly-N-vinylcarbazole, a halogenated poly-N-vinylcarbazole, polyvinylanthracene, poly-9-vinylphenylanthracene, polyvinylpyrene, polyvinylacridine, polyvinylacenaphthalene, polyglycidylcarbazole, pyrene-formaldehyde resins, ethylcarbazole-formaldehyde resins, etc., can also be used as charge transport substance. Such photoconductive polymers may construct a layer by itself.

In the present invention, a photosensitive layer preferably has a laminated structure because the electrophotographic photoreceptor exhibits high sensitivity and low residual potential. In this case, the charge generating layer may be formed either by coating a dispersion of the bisazo compound in a binder resin or by sublimation or vacuum evaporation of the bisazo compound. The order of forming a charge generating layer and a charge transport layer is not limited. In the case where the charge generating layer is an upper layer, the resulting electrophotographic photoreceptor can be positively charged; and where it is a lower layer, the photoreceptor can be negatively charged.

If desired, an adhesive layer may be provided between the above-described photosensitive layer and the conductive support. The adhesive layer can be formed by applying a commonly employed synthetic resin, e.g., polyesters, generally to a thickness of from about 0.5 to 5 μm.

The present invention is now illustrated in greater detail by way of the following examples, but it should be understood that the present invention is not deemed to be limited thereto. In these examples, all the parts are by weight unless otherwise indicated.

EXAMPLE 1

One part of a polyvinyl butyral resin ("BLX" produced by Sekisui Chemical Co., Ltd.) was dissolved in 40 parts of cyclohexanone, and the solution was mixed with 3 parts of Compound No. 1. The resulting mixture was throughly dispersed in a paint shaker, and the dispersion was coated on an aluminum sheet using an applicator and dried to form a charge generating layer having a dry thickness of 0.2 μm.

A uniform solution consisting of 1 part of N,N'-diphenyl-N,N'-bis(3-methylphenyl)-[1,1'-biphenyl]-4,4'-diamine, 1 part of a polycarbonate resin ("Lexan 145" produced by General Electric Co.; molecular weight: from 35,000 to 40,000), and 15 parts of dichloromethane was then coated on the charge generating layer by means of an applicator and dried to form a charge transport layer having a dry thickness of 20 μm.

The thus produced electrophotographic photoreceptor was evaluated for performance characteristics by means of an electrostatic copying paper testing apparatus ("SP-428" manufactured by Kawaguchi Denki Seisakusho) as follows. The photoreceptor was negatively charged to −6 KV by corona discharge and allowed to stand in a dark place for 2 seconds. A surface potential Vpo (volt) at this point was measured. Thereafter, the photoreceptor was exposed to light of a tungsten lamp at an illuminance of 5 lux, and a time required for the surface potential to decrease to a half of Vpo was measured to calculate an exposure amount $E_{\frac{1}{2}}$ (lux.sec). These measurements were repeated 20 times. The results obtained in the first and 20th measurements are shown in Table 1 below.

TABLE 1

|  | 1st Measurement | 20th Measurement |
| --- | --- | --- |
| Vpo (volt) | −825 | −815 |
| $E_{\frac{1}{2}}$ (lux.sec) | 2.1 | 2.1 |

EXAMPLES 2 TO 5

An electrophotographic photoreceptor was produced in the same manner as described in Example 1, except that each of Compound Nos. 2, 4, 12, and 14 was used in place of Compound No. 1. Performance characteristics of the resulting photoreceptors were evaluated in the same manner as in Example 1. The results obtained are shown in Table 2 below.

TABLE 2

| Example No. | 1st Measurement Vpo (volt) | 1st Measurement $E_{\frac{1}{2}}$ (lux.sec) | 20th Measurement Vpo (volt) | 20th Measurement $E_{\frac{1}{2}}$ (lux.sec) |
| --- | --- | --- | --- | --- |
| 2 | −830 | 1.1 | −825 | 1.1 |
| 3 | −920 | 1.8 | −910 | 1.8 |
| 4 | −875 | 2.0 | −855 | 1.9 |
| 5 | −760 | 1.7 | −755 | 1.7 |

COMPARATIVE EXAMPLES 1 AND 2

An electrophotographic photoreceptor was produced in the same manner as in Example 1, except that Comparative Compound No. 1 or 2 shown below was used in place of Compound No. 1, and performance characteristics of the resulting photoreceptors were evaluated in the same manner as in Example 1. The results obtained are shown in Table 3 below.

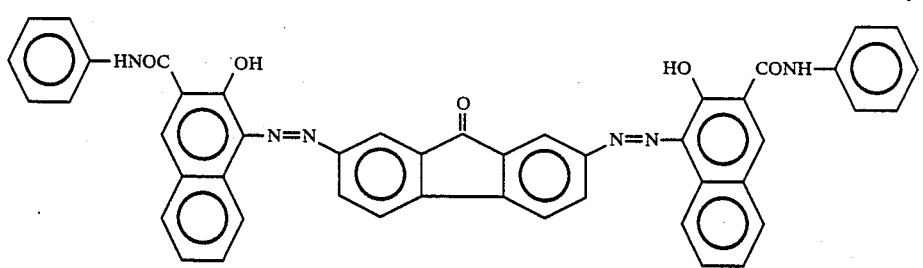

Comparative Compound No. 1

(described in Japanese Patent Application (OPI) No. 22834/79)

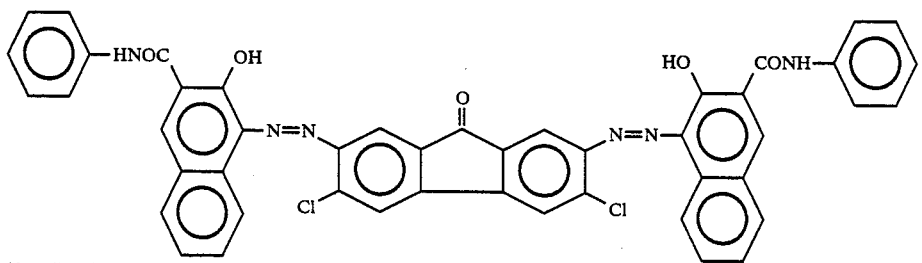

Comparative Compound No. 2

(described in Japanese Patent Application (OPI) Nos. 129653/86 and 221751/86)

TABLE 3

| Comparative Example No. | 1st Measurement Vpo (volt) | 1st Measurement $E_{\frac{1}{2}}$ (lux.sec) | 20th Measurement Vpo (volt) | 20th Measurement $E_{\frac{1}{2}}$ (lux.sec) |
|---|---|---|---|---|
| 1 | −800 | 5.0 | −770 | 5.2 |
| 2 | −850 | 4.2 | −810 | 4.1 |

It can be seen from the results of the foregoing Examples and Comparative Examples that the bisazo compounds according to the present invention show excellent electrophotographic characteristics as compared with the conventionally proposed azo pigments.

As described above, the electrophotographic photoreceptors in which the bisazo compounds according to the present invention are used exhibit excellent sensitivity and durability as compared with those in which the conventional organic photoconductive substances are used.

While the invention has been described in detail and with reference to specific embodiments thereof, it will be apparent to one skilled in the art that various changes and modifications can be made therein without departing from the spirit and scope thereof.

What is claimed is:

1. An electrophotographic photoreceptor comprising a conductive support having provided thereon a photosensitive layer containing a bisazo compound represented by the formula (I)

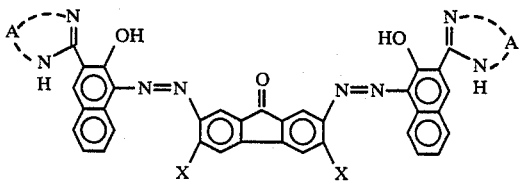

wherein X represents a halogen atom or a nitro group, and A represents a substituted or unsubstituted divalent aromatic hydrocarbon group or a substituted or unsubstituted divalent nitrogen-containing heterocyclic group.

2. An electrophotographic photoreceptor as claimed in claim 1, wherein X represents a chlorine atom and A represents a substituted or unsubstituted o-phenylene group, a substituted or unsubstituted o-naphthylene group, a substituted or unsubstituted perinaphthylene group, a substituted or unsubstituted 2,3-pyridine-diyl group, a substituted or unsubstituted 3,4-pyridine-diyl group, a substituted or unsubstituted 4,5-pyridine-diyl group, or a substituted or unsubstituted 9,10-phenanthrylene group, wherein the substituent or substituents for A is or are selected from an alkyl group having from 1 to 18 carbon atoms, an alkoxy group having from 1 to 4 carbon atoms, a carboxyl groups, a hydroxyl group, a nitro group, and a halogen atom.

3. An electrophotographic photoreceptor as claimed in claim 1, wherein said bisazo compound is present in an amount of from about 10 to 90% by weight of the total weight of the layer in which the bisazo compound is added.

4. An electrophotographic photoreceptor as claimed in claim 1, wherein said photosensitive layer has a laminated structure composed of a charge generating layer and a charge transport layer.

5. An electrophotographic photoreceptor as claimed in claim 4, wherein said bisazo compound is present in the charge generating layer in an amount of from about 50 to 90% by weight based on the weight of the charge generating layer.

6. An electrophotographic photoreceptor as claimed in claim 1, wherein said photosensitive layer is a layer having the bisazo compound dispersed in a binder resin.

7. An electrophotographic photoreceptor as claimed in claim 6, wherein said bisazo compound is contained in an amount of from about 10 to 50% by weight based on the weight of said layer.

8. An electrophotographic photoreceptor as claimed in claim 1, wherein said photosensitive layer is a layer having the bisazo compound and a charge transfer complex dispersed in a binder resin.

9. An electrophotographic photoreceptor as claimed in claim 8, wherein said bisazo compound is contained in an amount of from about 10 to 50% by weight based on the weight of said layer.

* * * * *